US011987463B2

(12) United States Patent
Jang et al.

(10) Patent No.: US 11,987,463 B2
(45) Date of Patent: May 21, 2024

(54) MEDIUM STORAGE DEVICE AND METHOD OF CONTROLLING THE MEDIUM STORAGE DEVICE

(71) Applicant: HYOSUNG TNS INC., Seoul (KR)

(72) Inventors: Hyun Soo Jang, Seoul (KR); Jun Young Kim, Seoul (KR); Jin Yu Lim, Seoul (KR); Dahye Shin, Seoul (KR)

(73) Assignee: HYOSUNG TNS INC., Seoul (KR)

( * ) Notice: Subject to any disclaimer, the term of this patent is extended or adjusted under 35 U.S.C. 154(b) by 244 days.

(21) Appl. No.: 17/677,207

(22) Filed: Feb. 22, 2022

(65) Prior Publication Data

US 2023/0264919 A1 Aug. 24, 2023

(51) Int. Cl.
*G07D 11/18* (2019.01)
*B65H 29/62* (2006.01)
(Continued)

(52) U.S. Cl.
CPC ............. *B65H 29/62* (2013.01); *B65H 31/00* (2013.01); *B65H 43/04* (2013.01); *G07D 7/00* (2013.01); *B65H 2701/1912* (2013.01)

(58) Field of Classification Search
CPC ...... G07D 11/18; G07D 11/245; G07D 11/40; G07D 11/14; G07D 11/20; G07D 11/12;
(Continued)

(56) References Cited

U.S. PATENT DOCUMENTS

2010/0245043 A1 9/2010 Doi et al.
2012/0024659 A1 2/2012 Mizoro
(Continued)

FOREIGN PATENT DOCUMENTS

JP H06-4767 A 1/1994
JP 2015056126 A 3/2015
(Continued)

OTHER PUBLICATIONS

Extended European Search Report in European Application No. 22158045.9 dated Aug. 12, 2022.
(Continued)

*Primary Examiner* — Luis A Gonzalez
(74) *Attorney, Agent, or Firm* — BACON & THOMAS, PLLC

(57) ABSTRACT

A medium storage device includes a safe having at a front portion a first entrance for replenishment and recovery to which a first transit cassette is selectively connected and at a rear portion a second entrance for replenishment and recovery to which a second transit cassette is selectively connected; an identification unit serving to identify whether the medium is a normal medium or a rejection medium; a recycle cassette configured to accommodate the medium recognized as the normal medium; a conveyance path configured to convey the medium between the first entrance, the second entrance, the identification unit, and the recycle cassette; and a control unit is configured to control the conveyance path such that the medium accommodated in the first transit cassette is conveyed to the identification unit, and the medium identified as the normal medium in the identification unit is conveyed to the recycle cassette.

9 Claims, 9 Drawing Sheets

(51) Int. Cl.
*B65H 31/00* (2006.01)
*B65H 31/34* (2006.01)
*B65H 43/04* (2006.01)
*G07D 7/00* (2016.01)

(58) Field of Classification Search
CPC ........ G07D 11/25; G07D 11/22; G07D 11/50; B65H 31/24; B65H 29/62; B56H 2701/1912
See application file for complete search history.

(56) References Cited

U.S. PATENT DOCUMENTS

| | | | | |
|---|---|---|---|---|
| 2014/0166432 | A1 | 6/2014 | Saiki | |
| 2014/0332340 | A1 | 11/2014 | Adachi et al. | |
| 2016/0163144 | A1* | 6/2016 | Lee | G07D 11/50 271/3.15 |
| 2016/0163145 | A1 | 6/2016 | Tamahashi | |
| 2021/0125449 | A1* | 4/2021 | Fukuda | G07D 11/40 |

FOREIGN PATENT DOCUMENTS

| | | | |
|---|---|---|---|
| JP | 5993640 | B2 | 9/2016 |
| JP | 2021056554 | A | 4/2021 |
| RU | 2573365 | C2 | 1/2016 |

OTHER PUBLICATIONS

Office Action in Russian Application No. 2022104654 dated Oct. 28, 2022 and English translation.

* cited by examiner

MEDIUM STORAGE DEVICE AND METHOD OF CONTROLLING THE MEDIUM STORAGE DEVICE

TECHNICAL FIELD

The present disclosure relates to a medium storage device and a method of controlling the medium storage device.

BACKGROUND

In general, an automated teller machine is an unmanned terminal that enables the deposit and withdrawal of mediums such as cash or checks without time restriction through the use of a cash card or a passbook.

Such an automated teller machine may have a medium storage box that may store mediums such as cash or checks, and a proper amount of mediums may be stored in the medium storage box. A medium stored in the medium storage box may be taken out of the medium storage box by a customer's request for withdrawal, and a new medium may be carried into the medium storage box by a customer's request for deposit. As such, a proper amount of the mediums stored in the medium storage box need to be maintained in preparation for the customer's request for deposit or withdrawal, and it is necessary to manage and monitor whether a proper amount of mediums is stored in the medium storage box in real time.

However, when a management company for replenishing the automated teller machine with mediums is far away from the automated teller machine, it is not easy for the management company to manage the amount of mediums in the automated teller machine in real time.

For example, in the case that a specific type of banknotes are insufficient in the automated teller machine, the automated teller machine may be replenished with the specific type of banknotes through a customer's deposit while a person of the management company goes to replenish the machine with the specific type of banknotes. Further, in the case that a specific type of banknotes is sufficient in the automated teller machine, the specific type of banknotes may be depleted in the automated teller machine through a customer's withdrawal while a person of the management company goes to replenish the machine with a different type of banknotes.

Meanwhile, a conventional medium storage device is problematic in that it is impossible to selectively take only a specific type of banknotes which need to be replenished among various types of banknotes out from a transit cassette, and to selectively take a desired amount of banknotes which need to be replenished from the transit cassette. Therefore, there is a need for a medium storage device capable of replenishing the machine by taking a desired type of banknotes and a desired amount of banknotes out from a transit cassette that stores various types of banknotes, and transferring an unnecessary type of banknotes back to the transit cassette.

SUMMARY

In view of the above, the present disclosure provides a medium storage device and a method of controlling the medium storage device, which are capable of replenishing or recovering a medium through the shortest path by mounting a first transit cassette and a second transit cassette at a front and a rear portion of a safe.

In accordance with a first aspect of the present disclosure, there is provided a medium storage device including: a safe having at a front portion a first entrance for replenishment and recovery to which a first transit cassette is selectively connected and at a rear portion a second entrance for replenishment and recovery to which a second transit cassette is selectively connected; an identification unit serving to identify whether the medium is a normal medium or a rejection medium; a recycle cassette configured to accommodate the medium recognized as the normal medium; a conveyance path configured to convey the medium between the first entrance for replenishment and recovery, the second entrance for replenishment and recovery, the identification unit, and the recycle cassette; and a control unit is configured to control the conveyance path such that the medium accommodated in the first transit cassette is conveyed to the identification unit, and the medium identified as the normal medium in the identification unit is conveyed to the recycle cassette.

The control unit may be configured to control the conveyance path such that the medium identified as the rejection medium in the identification unit is conveyed to the second transit cassette.

The control unit may be configured to control the conveyance path such that the medium accommodated in the second transit cassette is conveyed to the identification unit, the normal medium identified in the identification unit is conveyed to the recycle cassette, and the rejection medium identified in the identification unit is conveyed to the first transit cassette.

The medium storage device may further include: a reject cassette configured to accommodate the rejection medium, wherein the control unit controls the conveyance path such that the medium accommodated in the recycle cassette is conveyed to the identification unit, the medium identified as the normal medium in the identification unit is conveyed to the first transit cassette, and the medium identified as the rejection medium in the identification unit is conveyed to the reject cassette.

The conveyance path may include: an upper conveyance path configured to provide a moving path of the medium conveyed into and from the identification unit; a lower conveyance path connected to the upper conveyance path to form a closed loop; a second branch conveyance path providing a medium moving path between the lower conveyance path and the recycle cassette; a third branch conveyance path providing a medium moving path between the lower conveyance path and the reject cassette; a fourth branch conveyance path providing a medium moving path between the first entrance and a front-side connection point of the upper conveyance path and the lower conveyance path; and a fifth branch conveyance path providing a medium moving path between the second entrance and a rear-side connection point of the upper conveyance path and the lower conveyance path.

The control unit may be configured to control the fourth branch conveyance path and the upper conveyance path such that a medium accommodated in the first transit cassette is conveyed to the identification unit, and control the upper conveyance path, the lower conveyance path, and the second branch conveyance path such that a medium identified as the normal medium in the identification unit is conveyed to the recycle cassette.

The control unit may be configured to control the upper conveyance path and the fifth branch conveyance path such that a medium identified as the rejection medium in the identification unit is conveyed to the second transit cassette.

The control unit may be configured to control the fifth branch conveyance path and the upper conveyance path such that a medium accommodated in the second transit cassette is conveyed to the identification unit, control the upper conveyance path, the lower conveyance path, and the second branch conveyance path such that a medium identified as the normal medium in the identification unit is conveyed to the recycle cassette, and control the fourth branch conveyance path and the upper conveyance path such that a medium identified as the rejection medium in the identification unit is conveyed to the first transit cassette.

The control unit may be configured to control the second branch conveyance path, the lower conveyance path and the upper conveyance path such that a medium accommodated in the recycle cassette is conveyed to the identification unit, control the upper conveyance path and the fourth branch conveyance path such that a medium identified as the normal medium in the identification unit is conveyed to the first transit cassette, and control the upper conveyance path and the third branch conveyance path such that a medium identified as the rejection medium in the identification unit is conveyed to the reject cassette.

The reject cassette may be positioned in a lower front portion of the safe to be adjacent to the first transit cassette.

In accordance with a second aspect of the present disclosure, there is provided a method for controlling a medium storage device in which a first transit cassette and a second transit cassette are respectively connected to a front portion and a rear portion of a safe, the method including: a medium receiving step of receiving a medium from a first transit cassette and conveying the medium to an identification unit; a primary medium identification step of identifying whether the medium conveyed to the identification unit is a normal medium or a rejection medium; a primary medium replenishment step of conveying the medium identified as the normal medium in the primary medium identification step to a recycle cassette to replenish the medium therein; and a temporary storage step of conveying the medium identified as the rejection medium in the primary medium identification step to the second transit cassette to temporarily accommodate the medium therein.

The method may further include: a medium conveying step of the medium temporarily accommodated in the second transit cassette to the identification unit; a secondary medium identification step of identifying whether the medium conveyed to the identification unit is a normal medium or a rejection medium; a secondary medium replenishment step of conveying the medium identified as the normal medium in the secondary medium identification step to the recycle cassette to replenish the medium therein; and a rejection medium treatment step of conveying the medium identified as the rejection medium in the secondary medium identification step to the first transit cassette.

According to embodiments of the present disclosure, it is capable of replenishing or recovering a medium through the shortest path by mounting the first transit cassette and the second transit cassette at the front and the rear portion of the safe.

Further, according to embodiments of the present disclosure, a medium identified as a normal banknote among the mediums carried from the first transit cassette is accommodated in the recycle cassette and a medium identified as a rejection banknote is temporarily accommodated in the second transit cassette, and then conveyed back to the first transit cassette.

DETAILED DESCRIPTION

Figure 1:
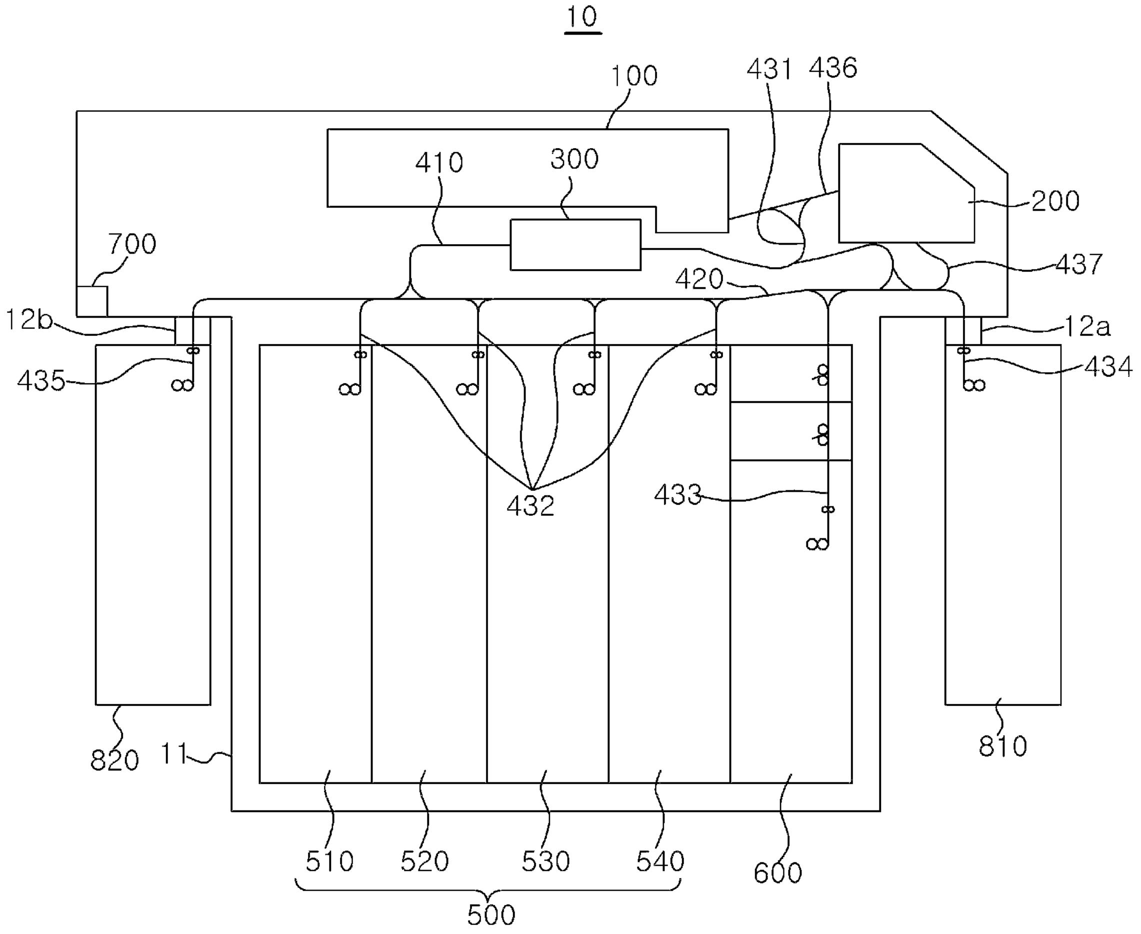
FIG. 1 is a diagram schematically illustrating the configuration of a medium storage device according to a first embodiment of the present disclosure.

Hereinafter, configurations and operations of embodiments will be described in detail with reference to the accompanying drawings. The following description is one of various patentable aspects of the disclosure and may form a part of the detailed description of the disclosure.

In describing the embodiments of the present disclosure, the detailed descriptions of well-known functions or configurations will be omitted if it is determined that the detailed descriptions of well-known functions or configurations may unnecessarily make obscure the spirit of the present disclosure.

The disclosure may be variously modified and may include various embodiments. Specific embodiments will be exemplarily illustrated in the drawings and described in the detailed description of the embodiments. However, it should be understood that they are not intended to limit the disclosure to specific embodiments but rather to cover all modifications, similarities, and alternatives which are included in the spirit and scope of the disclosure.

The terms used herein, including ordinal numbers such as "first" and "second" may be used to describe, and not to limit, various components. The terms simply distinguish the components from one another.

When it is said that a component is "connected" or "linked" to another component, it should be understood that the former component may be directly connected or linked to the latter component or a third component may be interposed between the two components.

Specific terms in the present disclosure are used simply to describe specific embodiments without limiting the present disclosure. An expression used in the singular encompasses the expression of the plural, unless it has a clearly different meaning in the context.

Hereinafter, a specific configuration of a medium storage device 10 according to a first embodiment of the present disclosure will be described with reference to the accompanying drawings.

As shown in FIGS. 1 to 7, the medium storage device 10 according to the first embodiment of the present disclosure may accommodate a medium in a recycle cassette 500 in the medium storage device 10 through a first transit cassette 810 and a second transit cassette 820 connected to a front portion and a rear portion of a safe 11, and may recover a medium accommodated the recycle cassette 500 through the first transit cassette 810 connected to the front portion of the safe 11.

The medium storage device 10 may include a safe 11, a temporary holding unit 100, a reception unit 200, an identification unit 300, a conveyance path, a recycle cassette 500, a reject cassette 600, and a control unit 700.

The safe 11 may provide a storage space to accommodate mediums therein. In the present embodiment, the safe 11 is not limited to a medium storage space, and the safe 11 may include a frame/housing that defines the entire appearance of the medium storage device 10.

The reception unit 200 may be provided in an upper front portion of the safe 11. Here, the front portion of the safe 11 may be understood as the side (right side of the drawing) where the reception unit 200 through which the deposit and withdrawal of mediums are made by a customer is located. An entrance 12*a* for replenishment and recovery to which the first transit cassette 810 can be connected may be provided at a lower side of the front portion of the safe 11. An entrance 12*b* for replenishment and recovery to which the second transit cassette 820 can be connectable may be provided at a lower side of the rear portion of the safe 11 and the temporary holding unit 100 may be provided at an upper rear portion.

The temporary holding unit 100 may be used for temporarily accommodating mediums. The temporary holding unit 100 may be connected to an upper conveyance path 410 through a first branch conveyance path 431 that will be described later.

The identification unit 300 may recognize mediums as either a normal medium or a rejection medium, by identifying whether the medium moving along the conveyance path is normal or abnormal. In this specification, the mediums may be divided into the normal medium and the rejection medium. The normal medium is a replenishment medium that needs to be replenished in the medium storage device 10, or a recovery medium that needs to be recovered from the medium storage device 10 to the transit cassette 800. Further, the rejection medium may be an abnormal medium, and may be a damaged or forged banknote or paper other than banknotes. For example, the rejection medium may be a torn banknote, a forged banknote, or a receipt. In addition, the rejection medium may include a normal medium that is not damaged in the first transit cassette 810 but is damaged while moving along the conveyance path, and a normal medium that is not damaged when it is carried into the recycle cassette 500 but is damaged while moving along the conveyance path after carried out from the recycle cassette 500.

The reception unit 200 may provide a space in which a medium deposited by a customer is carried, and may provide a space from which a medium that needs to be withdrawn by a customer is taken. The reception unit 200 may be connected to a first branch conveyance path 431 through a sixth branch conveyance path 436 that will be described later. When a customer deposits a medium, the reception unit 200 may transfer the deposited medium, through the sixth branch conveyance path 436, the first branch conveyance path 431 and the upper conveyance path 410, to the identification unit 300. In addition, the reception unit 200 may be connected through a seventh branch conveyance path 437 to a front connection point at which the upper conveyance path 410 and the lower conveyance path 420 are connected.

The recycle cassette 500 may accommodate a medium. The medium accommodated in the recycle cassette 500 may be taken out through the first transit cassette 810 when a recovery is required, and the medium may be taken out through the reception unit 200 when a customer requests withdrawal. The medium deposited into the reception unit 200 by the customer's deposit request may be carried into the recycle cassette 500 through the identification unit 300.

A plurality of recycle cassettes 500 may be provided. For example, the recycle cassette 500 may include a first recycle cassette 510, a second recycle cassette 520, a third recycle cassette 530, and a fourth recycle cassette 540 that are subsequently arranged in the direction toward the front portion of the safe 11 (where the reception unit 200 is located). In this case, the first recycle cassette 510 may be disposed on the rear side in the safe 11 with respect to the front-side branch point of the upper conveyance path 410 and the lower conveyance path 420, and the second recycle cassette 520, the third recycle cassette 530, and the fourth recycle cassette 540 are disposed on the front side of the safe 11 with respect to the front-side branch point of the upper conveyance path 410 and the lower conveyance path 420. In this case, when the medium is carried in (replenished) through the first transit cassette 810, the medium identified as the normal medium by the identification unit 300 may be replenished preferentially in the first cycle cassette 510 over the remaining cycle cassettes 520, 530, and 540. Accordingly, when the medium temporarily accommodated in the second transit cassette 820 is conveyed through the identification unit 300 to the recycle cassette 500, the medium identified as the normal medium by the identification unit 300 may be conveyed to the remaining recycle cassettes 520, 530 and 540 except for the first recycle cassette 510 (see FIG. 4).

Figure 4:
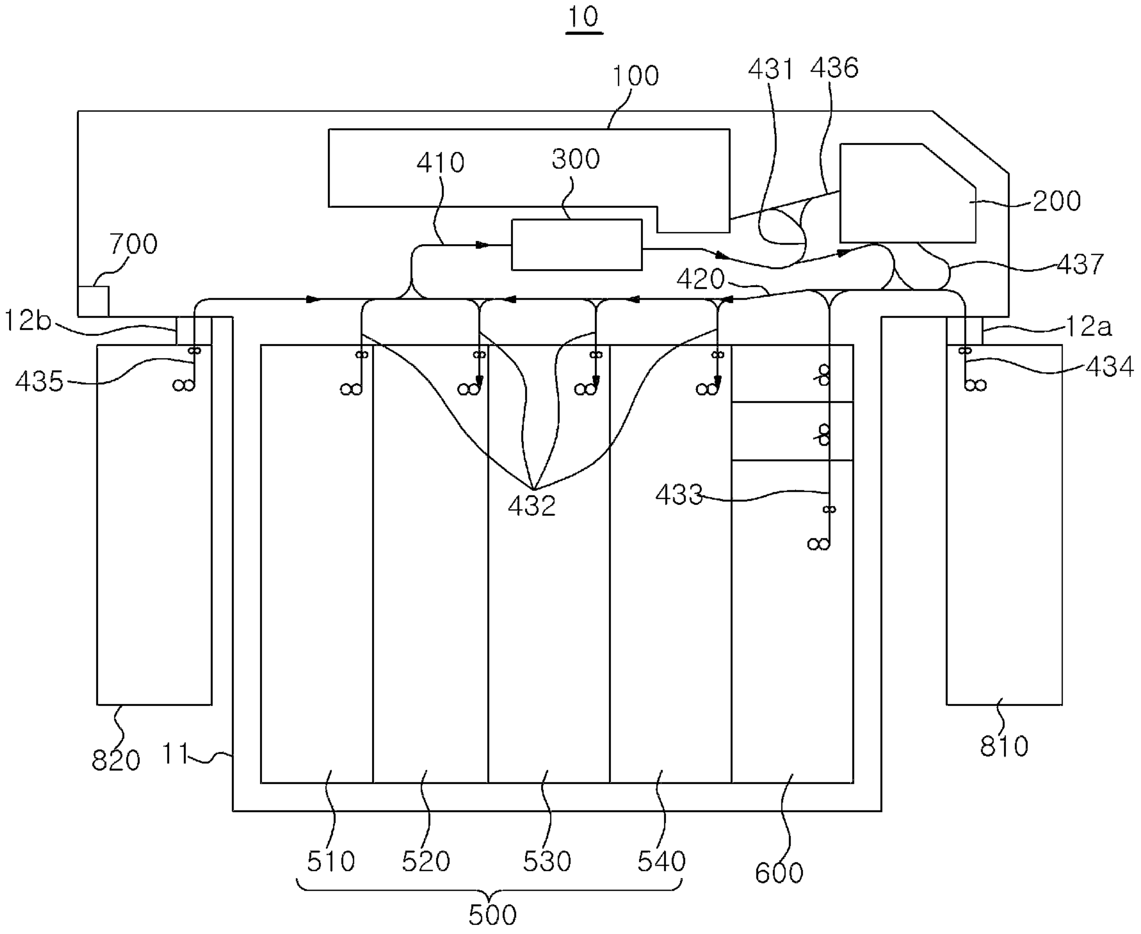
FIG. 4 is a state diagram illustrating a path along which a medium in the second transit cassette is conveyed through the identification unit to the recycle cassette, in the medium storage device according to the first embodiment of the present disclosure.

When the medium is carried in (replenished) through the first transit cassette 810, if the first recycle cassette 510 is not replenished preferentially over the remaining recycle cassettes 520, 530, and 540, that is, if the first recycle cassette 510 is replenished partially like the remaining recycle cassettes 520, 530 and 540, when the medium temporarily accommodated in the second transit cassette 820 is conveyed through the identification unit 300 to the recycle cassette 500 as shown in FIG. 4, there may occur a collision between the medium conveyed from the second transit cassette 820 to the identification unit 300 and the medium conveyed through the identification unit 300 to the first recycle cassette 510. Accordingly, in the present embodiment, when the medium is carried in (replenished) through the first transit cassette 810, the medium identified as the normal medium by the identification unit 300 is replenished preferentially in the first recycle cassette 510 over the remaining recycle cassettes 520, 530 and 540.

A sensor (not shown) may be provided in the recycle cassette 500 to maintain a proper amount of mediums according to the type of mediums in preparation for a customer's deposit or withdrawal request. Such a sensor may sense whether a proper amount of mediums is accommodated in the recycle cassette 500, and may inform a management company for the medium storage device 10 whether the mediums in the recycle cassette 500 are insufficient.

The reject cassette 600 may accommodate a damaged medium (e.g., rejection banknote). The reject cassette 600 may be disposed in a lower front portion of the safe 11 to be positioned adjacent to the first transit cassette 810. Since the reject cassette 600 is disposed adjacent to the first transit cassette 810, mediums may be rapidly moved between the reject cassette 600 and the first transit cassette 810. For example, in the case that a medium which is being conveyed from the recycle cassette 500 to the first transit cassette 810 is damaged during the transfer and is identified as a rejection medium in the identification unit 300, the rejection medium may be accommodated in the reject cassette 600.

The conveyance path may convey mediums between the temporary holding unit 100, the identification unit 300, the reception unit 200, the recycle cassette 500, the reject cassette 600, the first transit cassette 810 and the second transit cassette 820.

Such a conveyance path may include a driving roller, a driven roller, a switch gate and the like to transfer the mediums. Further, the conveyance path may be driven by a motor (not shown), and may be controlled by a control unit 700. The conveyance path may include an upper conveyance path 410, a lower conveyance path 420, a first branch conveyance path 431, a second branch conveyance path 432, a third branch conveyance path 433, a fourth branch conveyance path 434, a fifth branch conveyance path 435, an sixth branch conveyance path 436 and a seventh branch conveyance path 437.

The upper conveyance path 410 may provide a moving path of mediums that are input/output to/from the identification unit 300. The upper conveyance path 410 may be connected to the lower conveyance path 420 to form a closed loop. The upper conveyance path 410 may be provided above the lower conveyance path 420. The first branch conveyance path 431 may branch from the upper conveyance path 410. The upper conveyance path 410 may transmit mediums, conveyed from the temporary holding unit 100 or the reception unit 200, through the identification unit 300 to the lower conveyance path 420, or may transmit mediums output from the identification unit 300 to the temporary holding unit 100, the reception unit 200 or the lower conveyance path 420.

The lower conveyance path 420 may be connected to the upper conveyance path 410 to form a closed loop. The second branch conveyance path 432 may branch from the lower conveyance path 420. In the lower conveyance path 420, a branch point to the recycle cassette 500 and a branch point to the reject cassette 600 may be sequentially placed in the direction toward the front of the safe 11. The switch gate may be provided at each branch point of the lower conveyance path 420 to be operated under the control of the control unit 700. The lower conveyance path 420 may convey mediums, conveyed from the upper conveyance path 410, to the second transit cassette 820, the recycle cassette 500 or the reject cassette 600 by adjusting the switch gates under the control of the control unit 700, or may convey mediums, conveyed from the second transit cassette 820 and the recycle cassette 500, to the upper conveyance path 410.

The first branch conveyance path 431 may branch from the upper conveyance path 410 to provide a medium moving path between the upper conveyance path 410 and the temporary holding unit 100. The first branch conveyance path 431 may branch upwardly from the upper conveyance path 410. The sixth branch conveyance path 436 may branch from the first branch conveyance path 431. The switch gate operated under the control of the control unit 700 may be provided at a branch point of the first branch conveyance path 431 from which the sixth branch conveyance path 436 branches.

The second branch conveyance paths 432 may branch from the lower conveyance path 420 to provide medium moving paths between the lower conveyance path 420 and the recycle cassettes 500. The second branch conveyance paths 432 may branch from the lower conveyance path 420 toward below in the direction toward the front portion of the safe 11.

The third branch conveyance path 433 may branch from a connection point between the upper conveyance path 410 and the lower conveyance path 420. The third branch conveyance path 433 may branch from the lower conveyance path 420 toward below in the direction toward the rear portion of the safe 11. The third branch conveyance path 433 may provide a medium moving path between the upper conveyance path 410 and the reject cassette 600, or a medium moving path between the lower conveyance path 420 and the reject cassette 600, by adjusting the switch gate under the control of the control unit 700.

The fourth branch conveyance path 434 may provide a medium moving path between a front-side connection point of the upper conveyance path 410 and the lower conveyance path 420, and the entrance 12*a* for replenishment and recovery. For example, along the fourth branch conveyance path 434, a medium conveyed from the first transit cassette 810 may be conveyed to the upper conveyance path 410, or a medium conveyed from the upper conveyance path 410 may be conveyed to the first transit cassette 810.

The fifth branch conveyance path 435 may provide a medium moving path between a rear-side connection point of the upper conveyance path 410 and the lower conveyance path 420 and the entrance 12*b* for replenishment and recovery. For example, along the fifth branch conveyance path 435, a medium conveyed from the second transit cassette 820 may be conveyed to the upper conveyance path 410, or a medium conveyed from the upper conveyance path 410 may be conveyed to the second transit cassette 820.

The sixth branch conveyance path 436 may branch from the first branch conveyance path 431 to be connected to the reception unit 200. The sixth branch conveyance path 436 may provide a medium moving path between the reception unit 200 and the temporary holding unit 100, or a medium moving path between the reception unit 200 and the upper conveyance path 410, by adjusting the switch gate under the control of the control unit 700.

The seventh branch conveyance path 437 may branch from the connection point between the upper conveyance path 410 and the lower conveyance path 420 to be connected to the reception unit 200. A medium conveyed from the reception unit 200 may be conveyed to the lower conveyance path 420 along the seventh branch conveyance path 437, by adjusting the switch gate under the control of the control unit 700.

The switch gates may be provided at branch points of the upper conveyance path 410, the lower conveyance path 420, the first branch conveyance path 431, the second branch conveyance path 432, the third branch conveyance path 433, the fourth branch conveyance path 434, the fifth branch conveyance path 435, the sixth branch conveyance path 436 and the seventh branch conveyance path 437 to switch a medium moving path. The switch gate may change its posture through rotation to selectively determine the medium moving path under the control of the control unit 700.

The control unit 700 may control the conveyance path such that, among mediums carried through the first transit cassette 810, the normal medium is conveyed to the recycle cassette 500 and the rejection medium is temporarily accommodated in the second transit cassette 820 to be conveyed back to the first transit cassette 810. Further, the control unit 700 may control the conveyance path such that, among mediums accommodated in the recycle cassette 500, the normal medium is conveyed to the first transit cassette 810 and the rejection medium is conveyed to the reject cassette 600. The control unit 700 may be implemented by a calculation device including a microprocessor, a measuring device such as a sensor, and a memory. Since the implementation method is obvious to those skilled in the art, a detailed description thereof will be omitted. Hereinafter, the control method of the control unit 700 will be described in detail.

Figure 2:
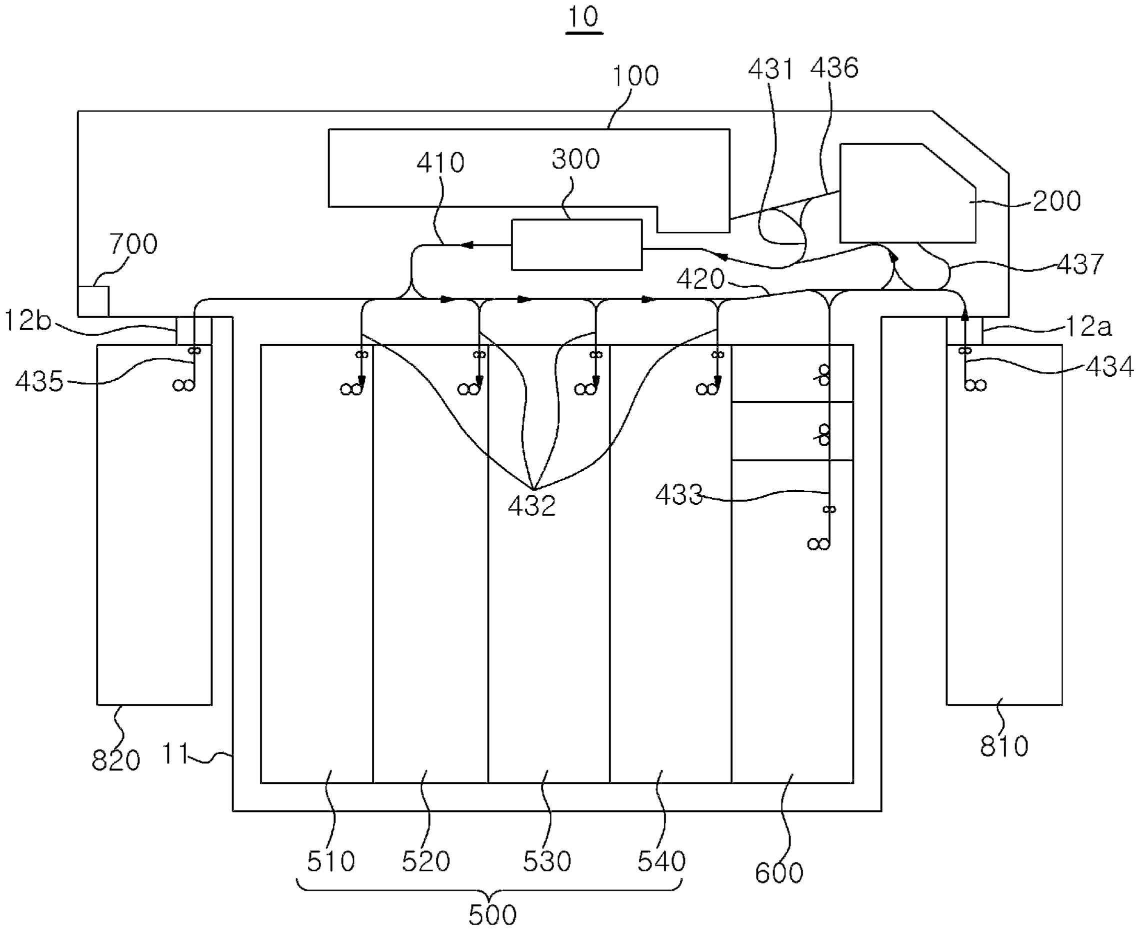
FIG. 2 is a state diagram illustrating a path along which a medium in a first transit cassette is conveyed through an identification unit to a recycle cassette, in the medium storage device according to the first embodiment of the present disclosure.
Figure 3:
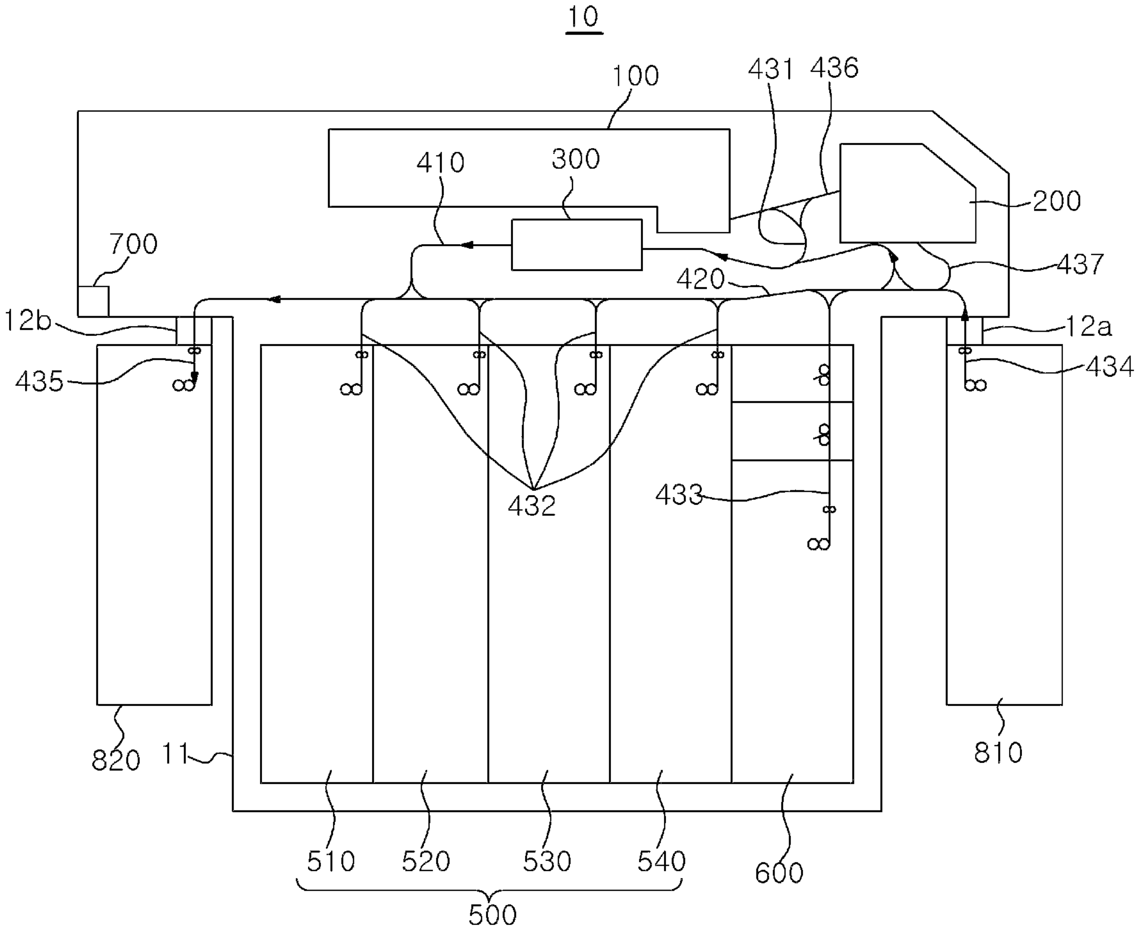
FIG. 3 is a state diagram illustrating a path along which a medium in the first transit cassette is conveyed through the identification unit to a second transit cassette, in the medium storage device according to the first embodiment of the present disclosure.

Specifically, referring to FIGS. 2 to 3, the control unit 700 may sequentially control the fourth branch conveyance path 434 and the upper conveyance path 410 to transfer the medium conveyed from the first transit cassette 810 to the identification unit 300. Further, the control unit 700 may control the conveyance path to transfer mediums to different places according to the types of the mediums identified in the identification unit 300.

For example, as shown in FIG. 2, the control unit 700 may control the upper conveyance path 410, the lower conveyance path 420 and the second branch conveyance path 432 such that the normal medium identified in the identification unit 300 is conveyed to the recycle cassette 500. In this case, the control unit 700 may control to transfer the medium to the first recycle cassette 510 preferentially over the remaining recycle cassettes 520, 530 and 540 among a plurality of recycle cassettes 500.

Further, as shown in FIG. 3, the control unit 700 may sequentially control the upper conveyance path 410 and the fifth branch conveyance path 435 such that the rejection medium identified in the identification unit 300 is conveyed to the second transit cassette 820. In other words, in the case that a medium is damaged during the transfer and is identified as the rejection medium in the identification unit 300, the controller 700 may sequentially control the upper conveyance path 410 and the fifth branch conveyance path 435 to transfer the rejection medium to the second transit cassette 820.

Figure 5:
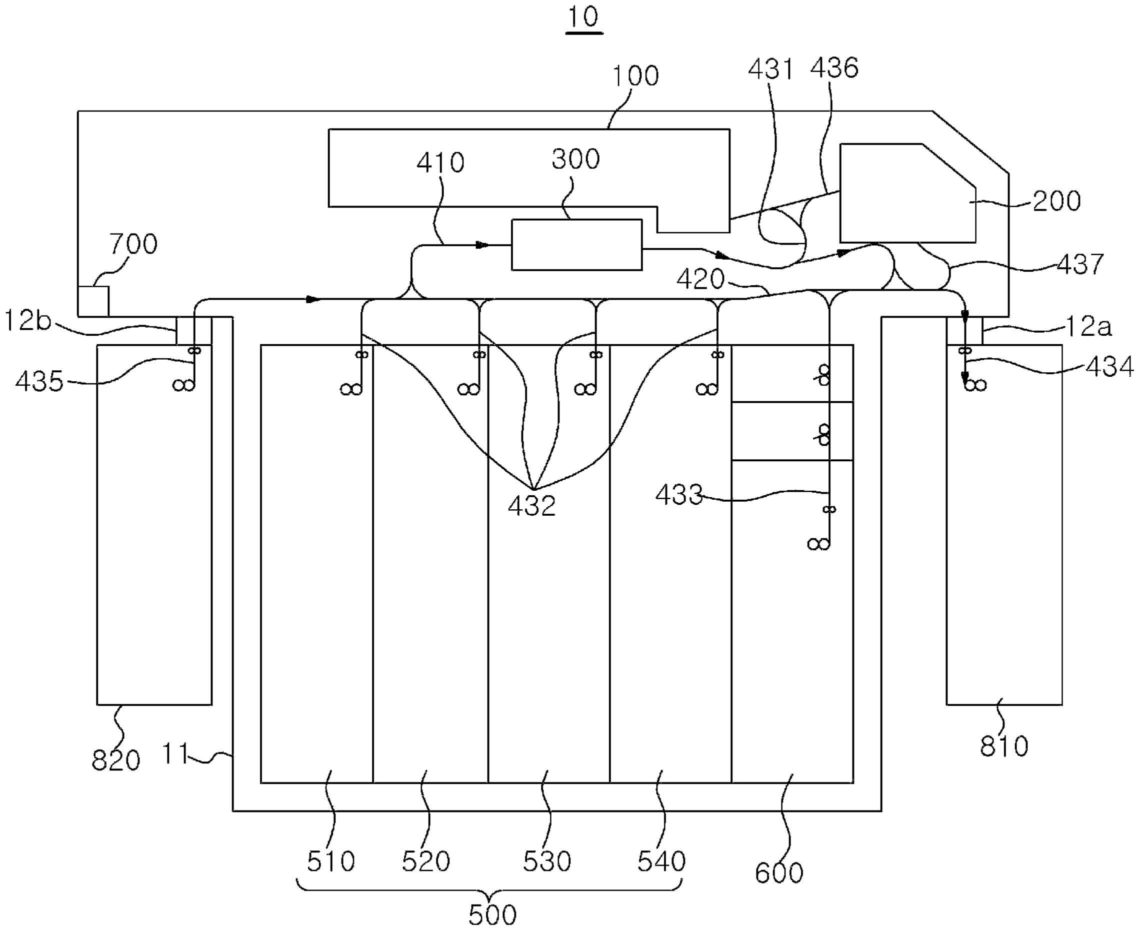
FIG. 5 is a state diagram illustrating a path along which a medium in the second transit cassette is conveyed through the identification unit to the first transit cassette, in the medium storage device according to the first embodiment of the present disclosure.

Meanwhile, referring to FIGS. 4 and 5, the control unit 700 may sequentially control the fifth branch conveyance path 435 and the upper conveyance path 410 to transfer medium temporarily accommodated in the second transit cassette 820 to the identification unit 300. Further, the control unit 700 may control the conveyance path to convey mediums to different places according to the types of the mediums identified in the identification unit 300.

For example, as shown in FIG. 4, the control unit 700 may sequentially control the upper conveyance path 410, the lower conveyance path 420, and the second branch conveyance path 432 such that the normal medium identified in the identification unit 300 is conveyed to the recycle cassette 500. In this case, the control unit 700 may control to convey the medium to the recycle cassettes 520, 530 and 540 except for the first recycle cassette 510, among a plurality of recycle cassettes 500. Further, as shown in FIG. 5, the control unit 700 may sequentially control the upper conveyance path 410 and the fourth branch conveyance path 434 such that the rejection medium identified in the identification unit 300 is conveyed to the second transit cassette 820.

Figure 6:
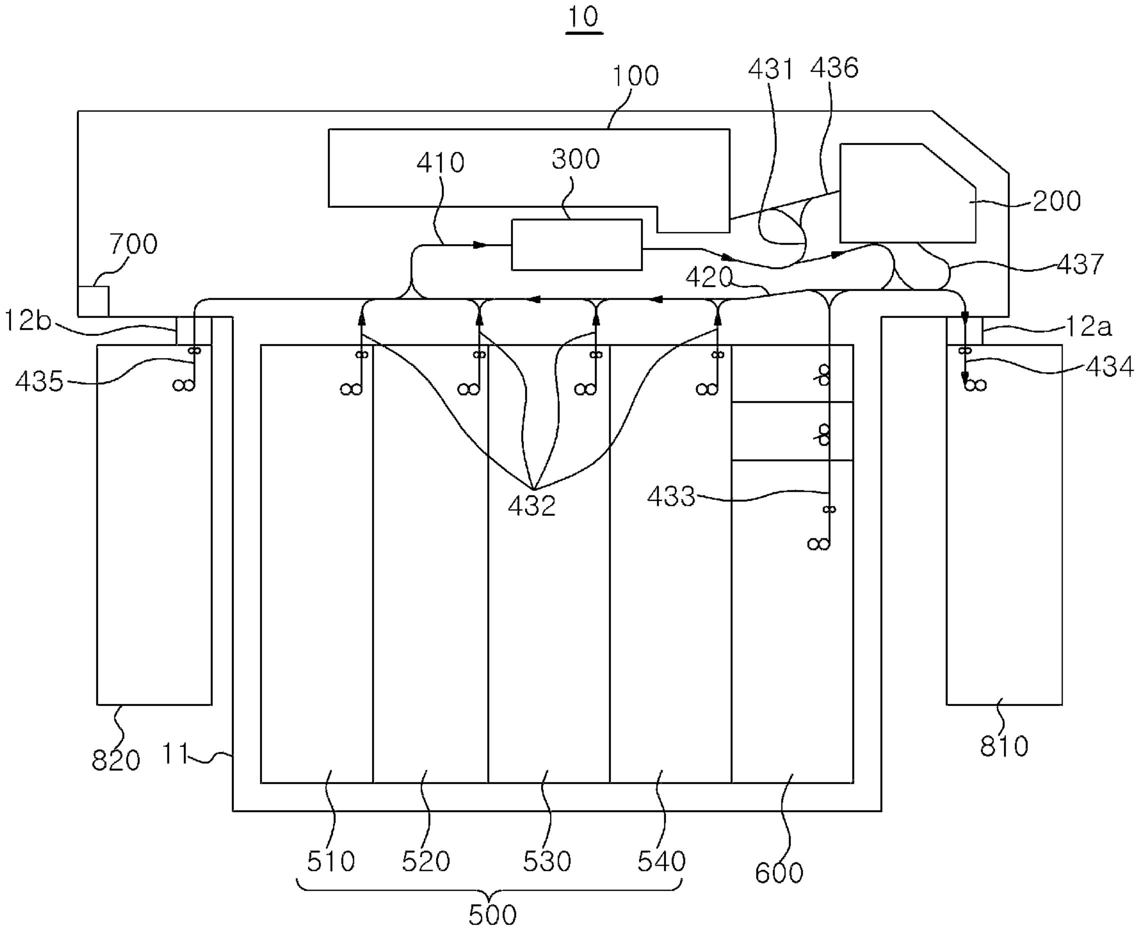
FIG. 6 is a state diagram illustrating a path along which a medium in the recycle cassette is conveyed through the identification unit to the first transit cassette, in the medium storage device according to the first embodiment of the present disclosure.
Figure 7:
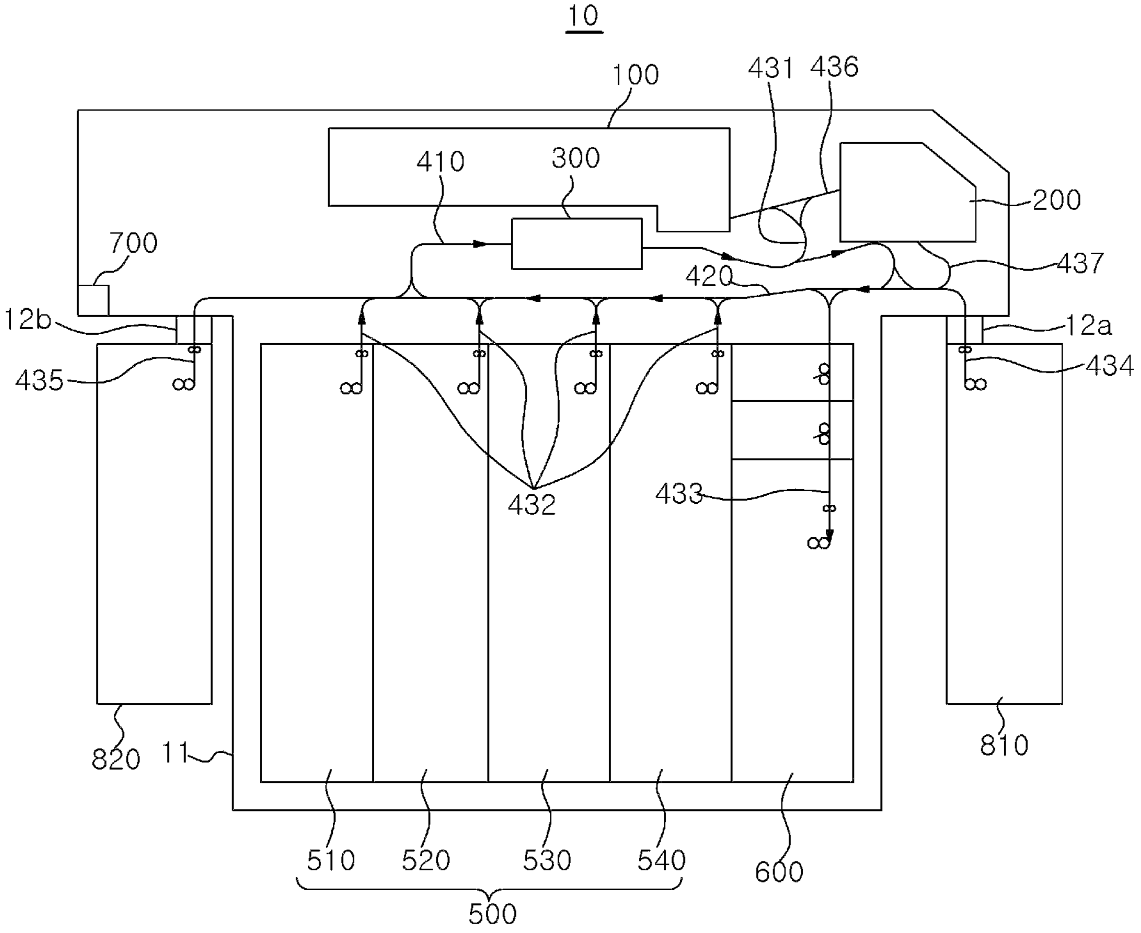
FIG. 7 is a state diagram illustrating a path along which a medium in the recycle cassette is conveyed through the identification unit to a reject cassette, in the medium storage device according to the first embodiment of the present disclosure.

Meanwhile, referring to FIGS. 6 and 7, the control unit 700 may control the second branch conveyance path 432 and the lower conveyance path 420 and the upper conveyance path 410 to convey mediums accommodated in the recycle cassette 500 to the identification unit 300. Further, the control unit 700 may control the conveyance path to convey the mediums to different places according to the types of the mediums identified in the identification unit 300.

As an example, as shown in FIG. 6, the control unit 700 may sequentially control the upper conveyance path 410 and the fourth branch conveyance path 434 such that the normal medium identified in the identification unit 300 is conveyed to the first transit cassette 810. Further, as shown in FIG. 7, the control unit 700 may sequentially control the upper conveyance path 410, the lower conveyance path 420 and the third branch conveyance path 433 such that the rejection medium identified in the identification unit 300 is conveyed to the reject cassette 600.

Hereinafter, in case of replenishing a medium using the first transit cassette 810 and the second transit cassette 820, a method of controlling the medium storage device will be described according to the first embodiment of the present disclosure.

Figure 8:
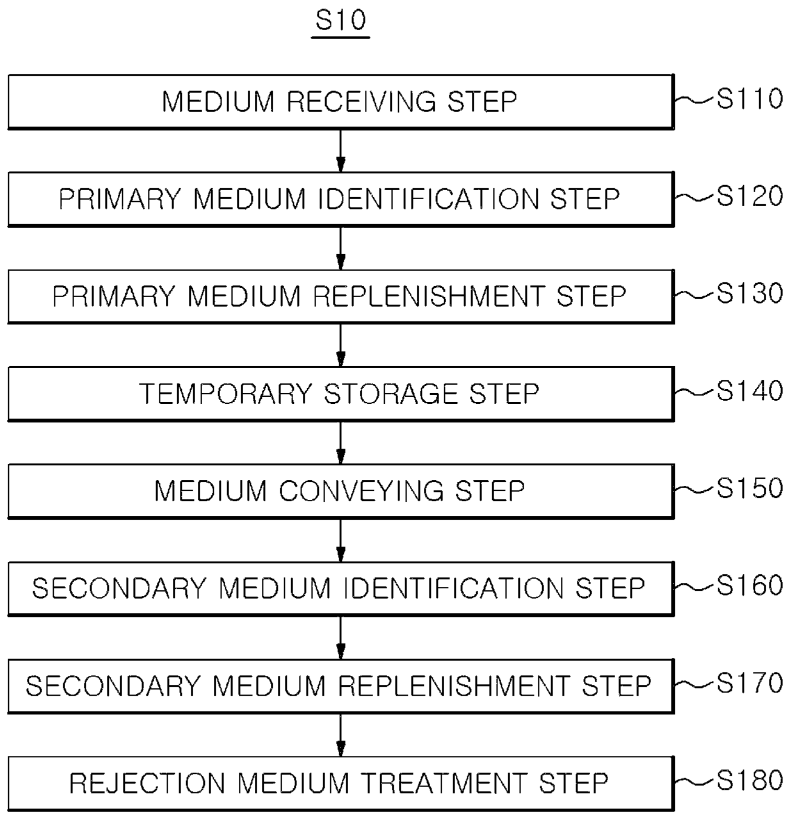
FIG. 8 is a flowchart schematically illustrating a method of controlling the medium storage device in case of replenishing a medium through the first transit cassette, according to the first embodiment of the present disclosure.

Referring to FIGS. 2 to 5, the method of controlling the medium storage device may provide a method of controlling the medium storage device 10 to recover mediums accommodated in the recycle cassette 500 through the first transit cassette 810 and the second transit cassette 820 respectively connected to the front and the rear portion of the safe 11. As shown in FIG. 8, the method of controlling the medium storage device S10 may include a medium receiving step S110, a primary medium identification step S120, a primary medium replenishment step S130, a temporary storage step S140, a medium conveying step S150, a secondary medium identification step S160, a secondary medium replenishment step S170 and a rejection medium treatment step S180.

In the medium receiving step S110, mediums conveyed from the first transit cassette 810 may be conveyed to the identification unit 300. In the medium receiving step S110, the first transit cassette 810 may be connected the first the entrance 12*a* for replenishment and recovery provided at a front portion of a safe 11 such that a medium in the first transit cassette 810 can be carried into the safe 11. In the medium receiving step S110, the medium of the first transit cassette 810 may be conveyed to the identification unit 300 through the fourth branch conveyance path 434 and the upper conveyance path 410.

In the primary medium identification step S120, a medium conveyed to the identification unit 300 may be identified and recognized as a normal medium or a rejection medium. In the primary medium identification step S120, the medium recognized as the normal medium may be conveyed to the recycle cassette 500. In the primary medium identification step S120, the mediums recognized as the rejection medium may be conveyed to the second transit cassette 820.

In the primary medium replenishment step S130, the medium identified as the normal medium in the identification unit 300 may be replenished to the recycle cassette 500. In the primary medium replenishment step S130, the medium recognized as the normal medium in the identification unit 300 may be conveyed through the upper conveyance path 410, the lower conveyance path 420 and the second branch conveyance path 432 to the recycle cassette 500 (see FIG. 2).

In the temporary storage step S140, the medium identified as the rejection medium in the identification unit 300 may be conveyed to and accommodated in the second transit cassette 820. In the temporary storage step S140, the medium identified as the rejection medium in the identification unit 300 may be conveyed to and accommodated in the second transit cassette 820 through the upper conveyance path 410 and the fifth branch conveyance path 435 (see FIG. 3).

In the medium conveying step S150, the medium temporarily accommodated in the second transit cassette 820 may be conveyed identification unit 300. In the medium conveying step S150, the medium temporarily accommodated in the second transit cassette 820 may be conveyed identification unit 300 through the fifth branch conveyance path 435 and the upper conveyance path 410.

In the secondary medium identification step S160, the medium conveyed to the identification unit 300 may be identified and recognized as the normal medium or the rejection medium.

In the secondary medium replenishment step S170, the medium recognized as the normal medium in the identification unit 300 may be conveyed to the recycle cassette 500. In the secondary medium replenishment step S170, the medium identified as the normal medium in the identification unit 300 may be conveyed through the upper conveyance path 410, the lower conveyance path 420, and the second branch conveyance path 432 to the recycle cassette 500 (see FIG. 4).

In the rejection medium treatment step S180, the medium identified in the identification unit 300 as the rejection medium may be conveyed to the first transit cassette 810. The medium identified as the rejection medium in the rejection medium treatment step S180 may be conveyed through the upper conveyance path 410 and the fourth branch conveyance path 434 to the first transit cassette 810 (see FIG. 5).

Hereinafter, in case of recovering a medium using the first transit cassette 810, a method of controlling the medium storage device will be described according to the first embodiment of the present disclosure.

Figure 9:
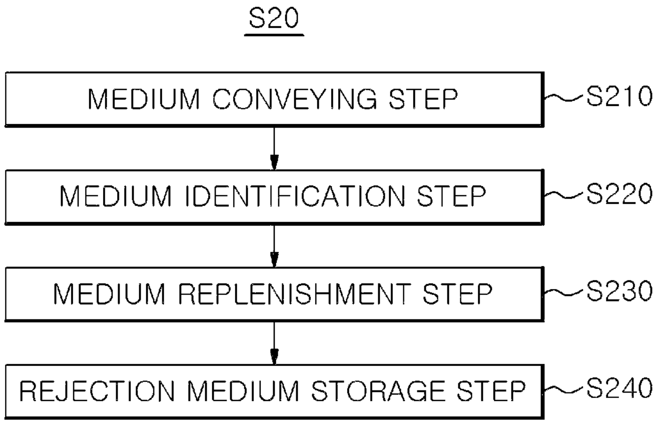
FIG. 9 is a flowchart schematically illustrating a method of controlling the medium storage device in case of recovering a medium through the first transit cassette, according to the first embodiment of the present disclosure.

Referring to FIGS. 6 to 7, the method of controlling the medium storage device may provide a method of controlling the medium storage device 10 to recover the medium accommodated in the recycle cassette 500 through the first transit cassette 810 connected to the front portion of the safe 11. As shown in FIG. 9, the method of controlling the medium storage device S20 may include a medium conveying step S210, a medium identification step S220, a medium replenishment step S230, and a rejection medium storage step S240.

In the medium conveying step S210, the medium accommodated in the recycle cassette 500 may be conveyed to the identification unit 300. In the medium conveying step S210, the medium accommodated in the recycle cassette 500 may be conveyed through the second branch conveyance path 432, the lower conveyance path 420 and the upper conveyance path 410 to the identification unit 300.

In the medium identification step S220, the medium conveyed to the identification unit 300 may be recognized as a normal medium or a rejection medium. The medium recognized as the normal medium in the medium identification step S220 may be conveyed to the first transit cassette 810 for recovery. The medium recognized as the rejection medium in the medium identification step S220 may be conveyed to the reject cassette 600.

In the medium recovery step S230, the medium recognized as the normal medium in the identification unit 300 may be recovered through the first transit cassette 810. In the medium recovery step S230, the medium recognized as the normal medium in the identification unit 300 may be conveyed through the upper conveyance path 410 and the fourth branch conveyance path 434 to the first transit cassette 810 (see FIG. 6).

In the rejection medium storage step S240, the medium recognized as the rejection medium in the identification unit 300 may be conveyed to and accommodated in the recycle cassette 600. In the rejection medium storage step S240, the medium recognized as the rejection medium in the identification unit 300 may be conveyed through the upper conveyance path 410, the lower conveyance path 420 and the third branch conveyance path 433 to the reject cassette 600 (see FIG. 7).

The examples of the present disclosure have been described above as specific embodiments, but these are only examples, and the present disclosure is not limited thereto, and should be construed as having the widest scope according to the technical spirit disclosed in the present specification. A person skilled in the art may combine/substitute the disclosed embodiments to implement a pattern of a shape that is not disclosed, but it also does not depart from the scope of the present disclosure. In addition, those skilled in the art can easily change or modify the disclosed embodiments based on the present specification, and it is clear that such changes or modifications also belong to the scope of the present disclosure.

What is claimed is:

1. A medium storage device comprising:

a safe having at a front portion a first entrance for replenishment and recovery to which a first transit cassette is selectively connected and at a rear portion a second entrance for replenishment and recovery to which a second transit cassette is selectively connected;

an identification unit serving to identify whether the medium is a normal medium or a rejection medium;

a recycle cassette configured to accommodate the medium recognized as the normal medium;

a conveyance path configured to convey the medium between the first entrance for replenishment and recovery, the second entrance for replenishment and recovery, the identification unit, and the recycle cassette; and a control unit configured to control the conveyance path such that the medium accommodated in the first transit cassette is conveyed to the identification unit, and the medium identified as the normal medium in the identification unit is conveyed to the recycle cassette, wherein the control unit is configured to control the conveyance path such that the medium identified as the rejection medium in the identification unit is conveyed to the second transit cassette, and wherein the control unit is configured to control the conveyance path such that the medium accommodated in the second transit cassette is conveyed to the identification unit, the normal medium identified in the identification unit is conveyed to the recycle cassette, and the rejection medium identified in the identification unit is conveyed to the first transit cassette.

2. The medium storage device of claim 1, further comprising:

a reject cassette configured to accommodate the rejection medium, wherein the control unit controls the conveyance path such that the medium accommodated in the recycle cassette is conveyed to the identification unit, the medium identified as the normal medium in the identification unit is conveyed to the first transit cassette, and the medium identified as the rejection medium in the identification unit is conveyed to the reject cassette.

3. The medium storage device of claim 2, wherein the conveyance path comprises:

an upper conveyance path configured to provide a moving path of the medium conveyed into and from the identification unit;

a lower conveyance path connected to the upper conveyance path to form a closed loop;

a second branch conveyance path providing a medium moving path between the lower conveyance path and the recycle cassette;

a third branch conveyance path providing a medium moving path between the lower conveyance path and the reject cassette;

a fourth branch conveyance path providing a medium moving path between the first entrance and a front-side connection point of the upper conveyance path and the lower conveyance path; and a fifth branch conveyance path providing a medium moving path between the second entrance and a rear-side connection point of the upper conveyance path and the lower conveyance path.

4. The medium storage device of claim 3, wherein the control unit is configured to control the fourth branch conveyance path and the upper conveyance path such that a medium accommodated in the first transit cassette is conveyed to the identification unit, and control the upper conveyance path, the lower conveyance path, and the second branch conveyance path such that a medium identified as the normal medium in the identification unit is conveyed to the recycle cassette.

5. The medium storage device of claim 4, wherein the control unit is configured to control the upper conveyance path and the fifth branch conveyance path such that a medium identified as the rejection medium in the identification unit is conveyed to the second transit cassette.

6. The medium storage device of claim 5, wherein the control unit is configured to control the fifth branch conveyance path and the upper conveyance path such that a medium accommodated in the second transit cassette is conveyed to the identification unit, control the upper conveyance path, the lower conveyance path, and the second branch conveyance path such that a medium identified as the normal medium in the identification unit is conveyed to the recycle cassette, and control the fourth branch conveyance path and the upper conveyance path such that a medium identified as the rejection medium in the identification unit is conveyed to the first transit cassette.

7. The medium storage device of claim 3, wherein the control unit is configured to control the second branch conveyance path, the lower conveyance path and the upper conveyance path such that a medium accommodated in the recycle cassette is conveyed to the identification unit, control the upper conveyance path and the fourth branch conveyance path such that a medium identified as the normal medium in the identification unit is conveyed to the first transit cassette, and control the upper conveyance path and the third branch conveyance path such that a medium identified as the rejection medium in the identification unit is conveyed to the reject cassette.

8. The medium storage device of claim 2, wherein the reject cassette is positioned in a lower front portion of the safe to be adjacent to the first transit cassette.

9. A method for controlling a medium storage device in which a first transit cassette and a second transit cassette are respectively connected to a front portion and a rear portion of a safe, the method comprising:

a medium receiving step of receiving a medium from a first transit cassette and conveying the medium to an identification unit;

a primary medium identification step of identifying whether the medium conveyed to the identification unit is a normal medium or a rejection medium;

a primary medium replenishment step of conveying the medium identified as the normal medium in the primary medium identification step to a recycle cassette to replenish the medium therein; and a temporary storage step of conveying the medium identified as the rejection medium in the primary medium identification step to the second transit cassette to temporarily accommodate the medium therein;

a medium conveying step of the medium temporarily accommodated in the second transit cassette to the identification unit;

a secondary medium identification step of identifying whether the medium conveyed to the identification unit is a normal medium or a rejection medium;

a secondary medium replenishment step of conveying the medium identified as the normal medium in the secondary medium identification step to the recycle cassette to replenish the medium therein; and a rejection medium treatment step of conveying the medium identified as the rejection medium in the secondary medium identification step to the first transit cassette.

* * * * *